(12) United States Patent
Liu et al.

(10) Patent No.: US 11,713,021 B2
(45) Date of Patent: Aug. 1, 2023

(54) VEHICLE CONTROL DEVICE AND VEHICLE CONTROL METHOD

(71) Applicant: HONDA MOTOR CO., LTD., Tokyo (JP)

(72) Inventors: Haisong Liu, Tokyo (JP); Ryo Morosawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/677,336

(22) Filed: Feb. 22, 2022

(65) Prior Publication Data

US 2022/0281411 A1 Sep. 8, 2022

(30) Foreign Application Priority Data

Mar. 8, 2021 (JP) ................. 2021-036356

(51) Int. Cl.
*B60R 25/01* (2013.01)
*B60R 25/31* (2013.01)
*B60Q 1/50* (2006.01)
*G06V 40/20* (2022.01)
*B60R 25/30* (2013.01)
*G06V 40/16* (2022.01)
*G06V 20/56* (2022.01)
*H04N 23/65* (2023.01)

(52) U.S. Cl.
CPC ................ *B60R 25/01* (2013.01); *B60Q 1/50* (2013.01); *B60R 25/305* (2013.01); *B60R 25/31* (2013.01); *G06V 20/56* (2022.01); *G06V 40/172* (2022.01); *G06V 40/20* (2022.01); *H04N 23/65* (2023.01); *B60Q 2400/40* (2013.01)

(58) Field of Classification Search
CPC ....... B60R 25/01; B60R 25/305; B60R 25/31; G06V 40/172; G06V 40/20; G06V 20/56; B60Q 1/50; B60Q 2400/40
See application file for complete search history.

(56) References Cited

U.S. PATENT DOCUMENTS

2011/0043341 A1* 2/2011 Kumagami ............ H04N 23/64
340/425.5
2011/0057783 A1* 3/2011 Yagi ...................... G08G 1/166
348/148

(Continued)

FOREIGN PATENT DOCUMENTS

JP 2003-138817 5/2003

*Primary Examiner* — Thomas D Alunkal
(74) *Attorney, Agent, or Firm* — Rankin, Hill & Clark LLP (57) ABSTRACT

A vehicle control device includes: a first behavior mode recognition unit that executes a first behavior mode recognition process of recognizing a first behavior mode of a target person based on an image captured by a first camera having a first resolution; a second behavior mode recognition unit that, when a distance between the vehicle and the target person is equal to or less than a predetermined distance, recognizes a second behavior mode of the target person based on an image captured by a second camera having a second resolution higher than the first resolution; a target person behavior recognition unit that recognizes a behavior of the target person against a vehicle based on the first behavior mode and the second behavior mode; and a control unit that executes predetermined control on the vehicle based on the behavior of the target person.

5 Claims, 6 Drawing Sheets

(56) References Cited

U.S. PATENT DOCUMENTS

| | | | |
|---|---|---|---|
| 2015/0235484 A1* | 8/2015 | Kraeling | G07C 5/0866 |
| | | | 701/1 |
| 2015/0339535 A1* | 11/2015 | Utagawa | G06T 7/246 |
| | | | 348/118 |
| 2020/0064483 A1* | 2/2020 | Li | G01S 7/4026 |
| 2021/0309183 A1* | 10/2021 | Bielby | G06V 20/52 |

* cited by examiner

VEHICLE CONTROL DEVICE AND VEHICLE CONTROL METHOD

INCORPORATION BY REFERENCE

The present application claims priority under 35 U.S.C. § 119 to Japanese Patent Application No. 2021-036356 filed on Mar. 8, 2021. The content of the application is incorporated herein by reference in its entirety.

BACKGROUND OF THE INVENTION

Field of the Invention

The present invention relates to a vehicle control device and a vehicle control method.

Description of the Related Art

In the related art, a smart entry system has been proposed that controls entry to a vehicle in a manner of capturing surroundings of the vehicle with an in-vehicle camera and using iris information of a target person extracted from an image of the target person approaching the vehicle to perform user authentication (for example, see Japanese Patent Laid-Open No. 2003-138817).

When the target person approaching the vehicle is recognized by the image captured by the camera as in the smart entry system described above, it is considered that the vehicle is controlled by recognition of a behavior of the target person from a movement locus of the target person. However, since it is necessary to continue capturing with a high-resolution camera for a certain period of time in order to accurately recognize the movement locus of the target person, there is an inconvenience that power consumption of the camera increases.

The present invention has been made in view of such a circumstance, and an object of the present invention is to provide a vehicle control device and a vehicle control method that can reduce power consumption of an in-vehicle camera and accurately recognize a behavior of a target person existing around a vehicle from an image captured by the in-vehicle camera.

SUMMARY OF THE INVENTION

In order to achieve the above object, a first aspect of the present invention is to provide a vehicle control device including: a first behavior mode recognition unit that executes a first behavior mode recognition process of using a first camera to capture surroundings of the vehicle and recognizing a first behavior mode of a target person existing around the vehicle based on an image captured by the first camera, the first camera being mounted on a vehicle and having a first resolution; a target person distance recognition unit that recognizes a distance between the vehicle and the target person; a second behavior mode recognition unit that, when the distance between the vehicle and the target person is equal to or less than a predetermined distance during execution of the first behavior mode recognition process, executes a second behavior mode recognition process of using a second camera to capture surroundings of the vehicle and recognizing a second behavior mode of the target person based on an image captured by the second camera, the second camera being mounted on the vehicle and having a second resolution higher than the first resolution; a target person behavior recognition unit that recognizes a behavior of the target person against the vehicle based on the first behavior mode and the second behavior mode; and a control unit that executes predetermined control on the vehicle based on the behavior of the target person recognized by the target person behavior recognition unit.

In the vehicle control device, the first behavior mode recognition unit may recognize the first behavior mode having continuity with the second behavior mode in the first behavior mode recognition process by converting a position of an image portion of the target person in the image captured by the first camera into a corresponding position in the image captured by the second camera through coordinate conversion from a coordinate system of the first camera to a coordinate system of the second camera.

In the vehicle control device, the vehicle control device may further include a user authentication unit that determines from a face image of the target person whether the target person is a user of the vehicle, the face image of the target person being extracted from the image captured by the second camera, the control unit being configured to regard the behavior of the target person recognized by the target person behavior recognition unit as a behavior of the user and to execute the predetermined control when the user authentication unit determines that the target person is the user.

In the vehicle control device, the user authentication unit may set a search range of an image of the target person in the image captured by the second camera, based on a position in the image captured by the first camera of an image portion of the target person extracted when the first behavior mode is recognized in the first behavior mode recognition process.

In the vehicle control device, when a plurality of the target persons are recognized in the first behavior mode recognition process, the target person behavior recognition unit may recognize the behavior of the target person based only on the second behavior mode without using the first behavior mode.

In order to achieve the above object, a second aspect of the present invention is to a vehicle control method to be executed by a computer, the method including: a first behavior mode recognition step of executing a first behavior mode recognition process of using a first camera to capture surroundings of the vehicle and recognizing a first behavior mode of a target person existing around the vehicle based on an image captured by the first camera, the first camera being mounted on a vehicle and having a first resolution; a target person distance recognition step of recognizing a distance between the vehicle and the target person; a second behavior mode recognition step of, when the distance between the vehicle and the target person is equal to or less than a predetermined distance during execution of the first behavior mode recognition process, executing a second behavior mode recognition process of using a second camera to capture surroundings of the vehicle and recognizing a second behavior mode of the target person based on an image captured by the second camera, the second camera being mounted on the vehicle and having a second resolution higher than the first resolution; a user behavior recognition step of recognizing a behavior of the target person against the vehicle based on the first behavior mode and the second behavior mode; and a control step of executing predetermined control on the vehicle based on the behavior of the target person recognized in the user behavior recognition step.

According to the vehicle control device of the aspect of the present invention, it is possible to reduce power consumption of an in-vehicle camera and accurately recognize the behavior of the target person existing around the vehicle from the image captured by the in-vehicle camera.

DETAILED DESCRIPTION OF THE PREFERRED EMBODIMENT

1. Configuration of Vehicle

A description will be given with reference to FIG. 1 with respect to a configuration of a vehicle 1 mounted with a vehicle control device 10 of the present embodiment. A front part of the vehicle 1 is provided with a first front camera 40a and a second front camera 40b that capture a front of the vehicle 1, and a front radar 44 that detects a position of a target existing in front of the vehicle 1. The second front camera 40b has a higher resolution than the first front camera 40a. Further, the second front camera 40b consumes more power consumption than the first front camera 40a.

A rear part of the vehicle 1 is provided with a first rear camera 43a and a second rear camera 43b that capture a rear of the vehicle 1, and a rear radar 47 that detects a position of a target existing behind the vehicle 1. The second rear camera 43b has a higher resolution than the first rear camera 43a. Further, the second rear camera 43b consumes more power consumption than the first rear camera 43a.

A right side part of the vehicle 1 is provided with a first right side camera 41a and a second right side camera 41b that capture a right side of the vehicle 1, and a right side radar 45 that detects a position of a target existing on a right side of the vehicle 1. The second right side camera 41b has a higher resolution than the first right side camera 41a. Further, the second right side camera 41b consumes more power consumption than the first right side camera 41a. In addition, the right side part of the vehicle 1 is provided with a welcome light 50 that irradiates a road surface near a driver's door 2 with a guide display 51 toward the driver's door 2.

A left side part of the vehicle 1 is provided with a first left side camera 42a and a second left side camera 42b that capture a left side of the vehicle 1, and a left side radar 46 that detects a position of a target existing on a left side of the vehicle 1. The second left side camera 42b has a higher resolution than the first left side camera 42a. Further, the second left side camera 42b consumes more power consumption than the first left side camera 42a.

Each of the first front camera 40a, the first right side camera 41a, the first left side camera 42a, and the first rear camera 43a corresponds to a first camera of the present disclosure. The resolution of each of the first front camera 40a, the first right side camera 41a, the first left side camera 42a, and the first rear camera 43a corresponds to a first resolution of the present disclosure. Each of the second front camera 40b, the second right side camera 41b, the second left side camera 42b, and the second rear camera 43b corresponds to a second camera of the present disclosure. The resolution of each of the second front camera 40b, the second right side camera 41b, the second left side camera 42b, and the second rear camera 43b corresponds to a second resolution of the present disclosure.

Further, the vehicle 1 is provided with a communication unit 80. The communication unit 80 communicates with a mobile terminal used by a pedestrian located in the vicinity of the vehicle 1, another vehicle, an external server, a roadside machine and the like.

The vehicle control device 10 recognizes a movement locus R1 of a target person U existing around the vehicle 1, based on images captured by the first front camera 40a, the second front camera 40b, the first right side camera 41a, the second right side camera 41b, the first left side camera 42a, the second left side camera 42b, the first rear camera 43a, and the second rear camera 43b. Then, the vehicle control device 10 recognizes a behavior (here, a behavior toward the driver's door 2 in a predicted route of R2) of the target person U from the movement locus R1 of the target person U, and executes predetermined control for the vehicle 1 such as lighting of the welcome light 50 or unlocking of the driver's door 2.

2. Configuration of Vehicle Control Device

A configuration of the vehicle control device will be described with reference to FIG. 2. The vehicle control device 10 is input with images captured by the first front camera 40a, the second front camera 40b, the first right side camera 41a, the second right side camera 41b, the first left side camera 42a, the second left side camera 42b, the first rear camera 43a, and the second rear camera 43b. In addition, the vehicle control device 10 is input with position detection data of the target by the front radar 44, the right side radar 45, the left side radar 46, and the rear radar 47.

By the control signal output from the vehicle control device 10, the welcome light 50 is turned on and off, and an operation of a lock mechanism of each door (not shown) is controlled. In addition, the vehicle control device 10 communicates with another vehicle and the like via the communication unit 80.

The vehicle control device 10 is a control unit including a processor 20, a memory 30, an interface circuit (not shown) and the like. The processor 20 corresponds to a computer of the present disclosure. The processor 20 reads and executes a control program 31 stored in the memory 30, thereby functioning as a first behavior mode recognition unit 21, a target person distance recognition unit 22, a second behavior mode recognition unit 23, a target person behavior recognition unit 24, a user authentication unit 25, and a control unit 26.

A process to be executed by the first behavior mode recognition unit 21 corresponds to a first behavior mode recognition step in a vehicle control method of the present disclosure, and a process to be executed by the target person distance recognition unit 22 corresponds to a target person distance recognition step in the vehicle control method of the present disclosure. A process to be executed by the second behavior mode recognition unit 23 corresponds to a second behavior mode recognition step in the vehicle control method of the present disclosure, and a process to be executed by the target person behavior recognition unit 24 corresponds to a target person behavior recognition step in the vehicle control method of the present disclosure. A process to be executed by the user authentication unit 25 corresponds to a user authentication step in the vehicle control method of the present disclosure, and a process to be executed by the control unit 26 corresponds to a control step of the present disclosure.

The first behavior mode recognition unit 21 executes a first behavior mode recognition process of recognizing a first movement locus of the target person U, as a first behavior mode of the target person U, from images of surroundings of the vehicle 1 captured by the first front camera 40*a*, the first right side camera 41*a*, the first left side camera 42*a*, or the first rear camera 43*a*. The second behavior mode recognition unit 23 executes a second behavior mode recognition process of recognizing a second movement locus of the target person U, as a second behavior mode of the target person U, from images of surroundings of the vehicle 1 captured by the second front camera 40*b*, the second right side camera 41*b*, the second left side camera 42*b*, or the second rear camera 43*b*. The target person distance recognition unit 22 recognizes a distance between the vehicle 1 and the target person U based on the position detection signal by the front radar 44, the right side radar 45, the left side radar 46, or the rear radar 47.

Figure 3:
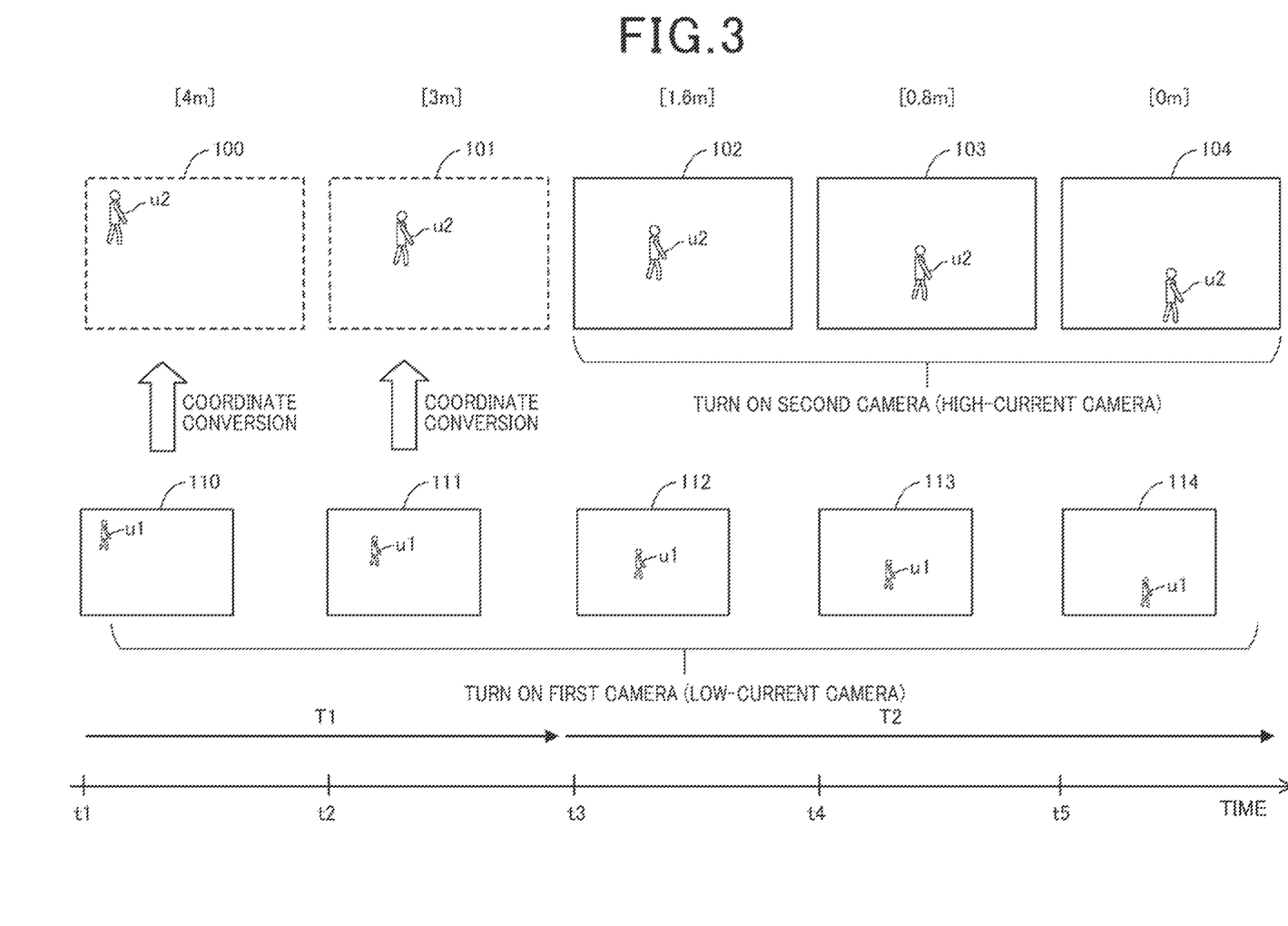
FIG. 3 is an explanatory diagram of a first behavior mode recognition process and a second behavior mode recognition process.

Here, details of the first behavior mode recognition process and the second behavior mode recognition process will be described with reference to FIG. 3. Here, a case will be described where the first behavior mode recognition process and the second behavior mode recognition process are executed in a situation where the target person U approaches the driver's door 2 of the vehicle 1 from a right front of the vehicle 1 as indicated by R1 and R2 in FIG. 1.

When the target person U approaches the vehicle 1 from the front of the vehicle 1, the first behavior mode recognition process and the second behavior mode recognition process are executed using the images captured by the first front camera 40*a* and the second front camera 40*b*. Further, when the target person U approaches the vehicle 1 from the left side of the vehicle 1, the first behavior mode recognition process and the second behavior mode recognition process are executed using the images captured by the first left side camera 42*a* and the second left side camera 42*b*. In addition, when the target person U approaches the vehicle 1 from the rear of the vehicle 1, the first behavior mode recognition process and the second behavior mode recognition process are executed using the images captured by the first rear camera 43*a* and the second rear camera 43*b*.

The first behavior mode recognition unit 21 recognizes the first movement locus of the target person U by extracting and tracking an image portion u1 of the target person U from time-series captured images 110, 111, . . . , and 114 sequentially captured at timings t1, t2, . . . , and t5 by the first right side camera 41*a*. The captured images 110, 111, 112, 113, and 114 are images captured by the first right side camera 41*a* at distances 4 m, 3 m, 1.6 m, 0.8 m, and 0 m between the target person U and the vehicle 1, respectively.

On the other hand, the second behavior mode recognition unit 23 starts operating the second right side camera 41*b* at t3 at which the distance between the target person U and the vehicle 1 recognized by the target person distance recognition unit 22 is equal to or less than a predetermined distance (being set to 1.6 m in the present embodiment). Then, the second behavior mode recognition unit 23 recognizes the second movement locus of the target person U by extracting and tracking an image portion u2 of the target person U from time-series captured images 102, 103, and 104 sequentially captured at timings t3, t4, and t5 by the second right side camera 41*b*.

The first behavior mode recognition unit 21 performs a pattern matching process using the image portion u1 of the target person U extracted from the captured image 110 at t1 as a template, and searches for the image portion u1 of the target person U from the captured images 111, 112, 113, and 114. Similarly, the second behavior mode recognition unit 23 performs a pattern matching process using the image portion u2 of the target person U extracted from the captured image 102 at t3 as a template, and searches for the image portion u2 of the target person U from the captured images 103 and 104.

As described above, the first right side camera 41*a* and the second right side camera 41*b* have different resolution (resolving power), and thus have different sizes in captured image. Therefore, there is no continuity between a position of the image portion u1 of the target person U in the captured images 110 and 111 with the first right side camera 41*a* for a period T1 and a position of the image portion u2 of the target person U in the captured images 102, 103, and 104 with the second right side camera 41*b* for a period T2.

Therefore, the first behavior mode recognition unit 21 performs a coordinate conversion process on the captured images 110 and 111 from a camera coordinate system of the first right side camera 41*a* to a camera coordinate system of the second right side camera 41*b*, and generates pseudo images 100 and 101. Then, the first behavior mode recognition unit 21 recognizes the first movement locus, which is the movement locus of the target person U in the period T1, depending on the position of the image portion u2 of the target person U in the pseudo images 100 and 101. Thereby, it is possible to ensure the continuity between the first movement locus of the target person U in the period T1 and the second movement locus of the target person U in the period T2 and to recognize the movement locus of the target person U through the periods T1 and T2.

The target person behavior recognition unit 24 recognizes the behavior of the target person U against the vehicle 1, based on the first movement locus of the target person U recognized by the first behavior mode recognition unit 21 and the second movement locus of the target person U recognized by the second behavior mode recognition unit 23. Further, the target person behavior recognition unit 24 recognizes the behavior of the target person against the vehicle 1 based only on the second movement locus when a plurality of target persons exist around the vehicle 1 and thus it is difficult to distinguish and identify each of the target persons at the resolution of the first right side camera 41*a*.

When the distance between the target person U and the vehicle 1 is equal to or less than 1.6 m and the second right side camera 41*b* starts operating, the user authentication unit 25 extracts the image portion of the target person from the image captured by the second right side camera 41*b*. Then, the user authentication unit 25 executes a user authentication process of collating a face image of the target person with a face image of a user of the vehicle 1 stored in the memory 30 and determining whether the target person is the user registered in the vehicle 1.

Figure 4:
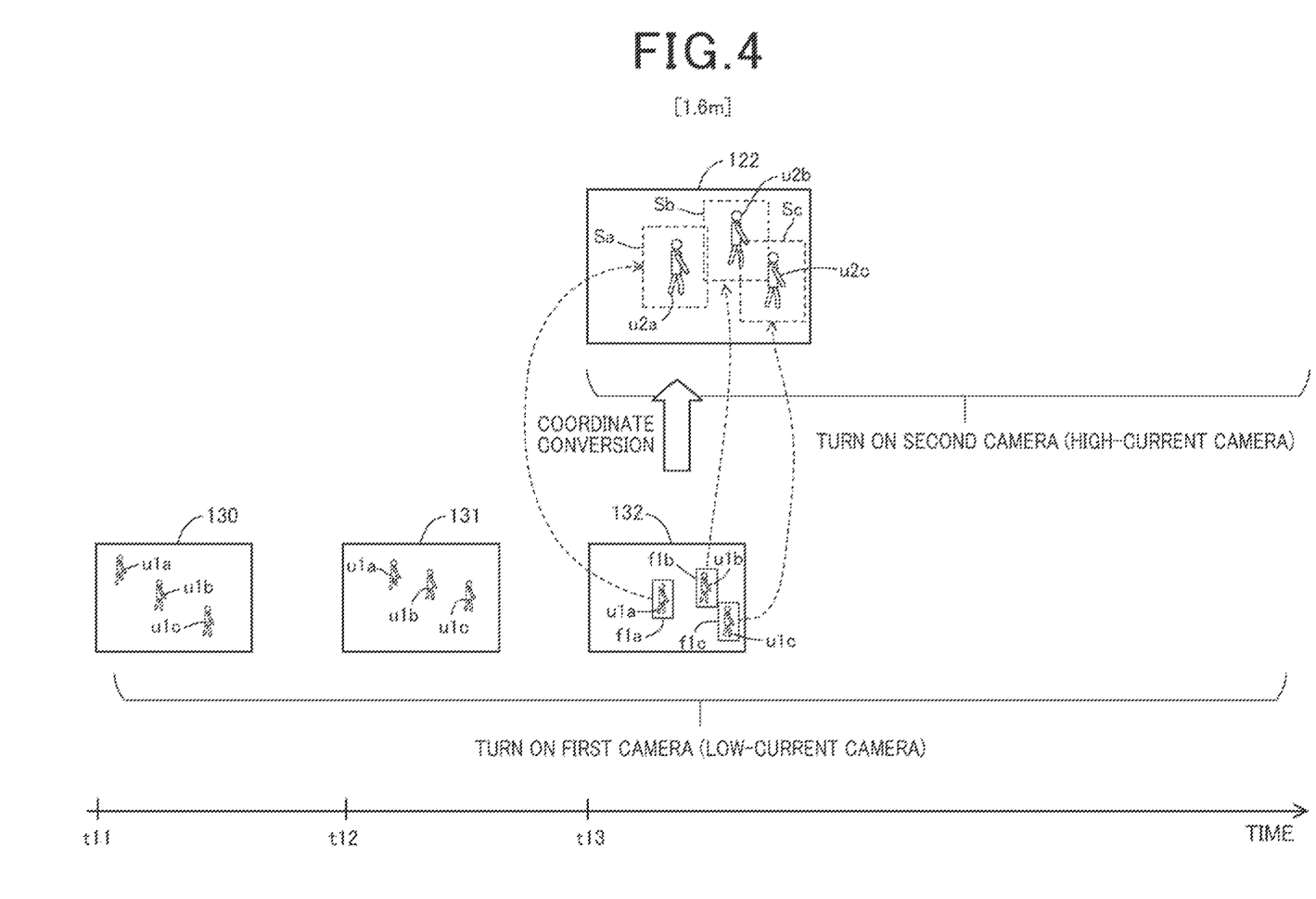
FIG. 4 is an explanatory diagram of a search region of an image portion of a target person.

Here, FIG. 4 shows a case where image portions u1*a*, u1*b*, and u1*c* of a plurality of target persons are extracted from images 130, 131, and 132 captured by the first right side camera 41*a* in the first behavior mode recognition process. The user authentication unit 25 acquires positions in an image 122 captured by the second right side camera 41*b* through coordinate conversion, the positions corresponding to positions of determination frames f1a, f1b, and f1c of the image portions u1a, u1b, and u1c in the captured image 132.

Then, the user authentication unit 25 sets search areas Sa, Sb, and Sc centered on the positions corresponding to the determination frames f1a, f1b, and f1c in the captured image 122, and searches for image portions u2a, u2b, and u2c of the target persons. Thereby, the user authentication unit 25 extracts efficiently the image portions u2a, u2b, and u2c of the target persons, and executes the user authentication process using the face images of the target persons.

When the user authentication unit 25 authenticates that the target person U is the user registered in the vehicle 1, the control unit 26 executes predetermined control for the vehicle 1 based on the behavior of the target person U against the vehicle 1 recognized by the target person behavior recognition unit 24. In the present embodiment, the control unit 26 executes control to unlock the door to which the target person U is heading when the behavior of the target person U approaching any of the doors of the vehicle 1 is recognized. Further, when the behavior of the target person U approaching the driver's door 2 is recognized, the control unit 26 executes control to turn on the welcome light 50. When the door of the vehicle 1 is a power door provided with an opening/closing actuator, the control unit 26 may control unlocking of the door and opening of the door.

3. Control Process According to Behavior of Target Person

Figure 1:
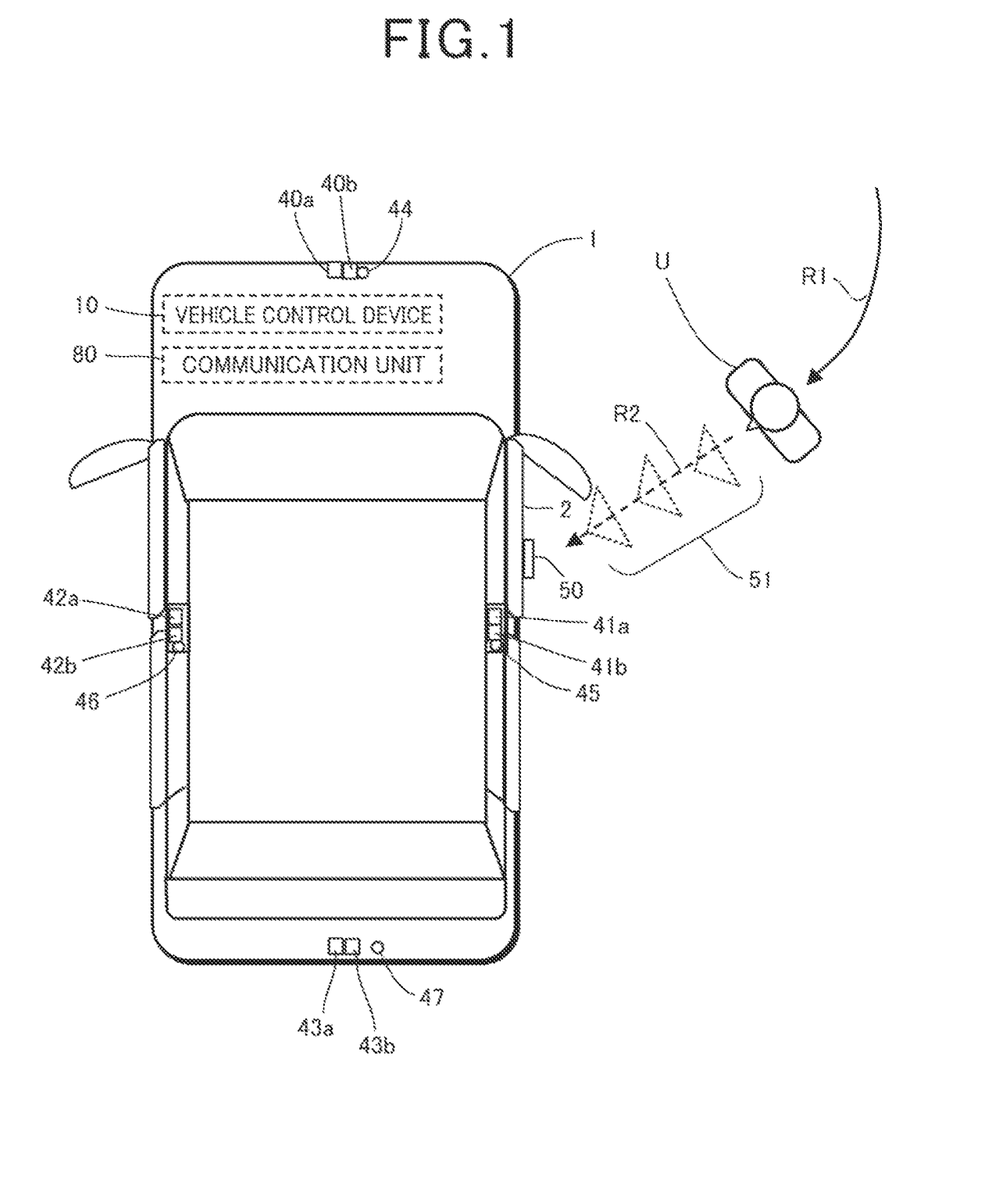
FIG. 1 is a configuration diagram of a vehicle mounted with a vehicle control device.

Referring to flowcharts shown in FIGS. 5 and 6, a description will be given with respect to a series process based on images captured by the first right side camera 41a and the second right side camera 41b to be executed by the vehicle control device 10 when the target person U approaches the driver's door 2 from the right side of the vehicle 1 as shown in FIG. 1.

Figure 5:
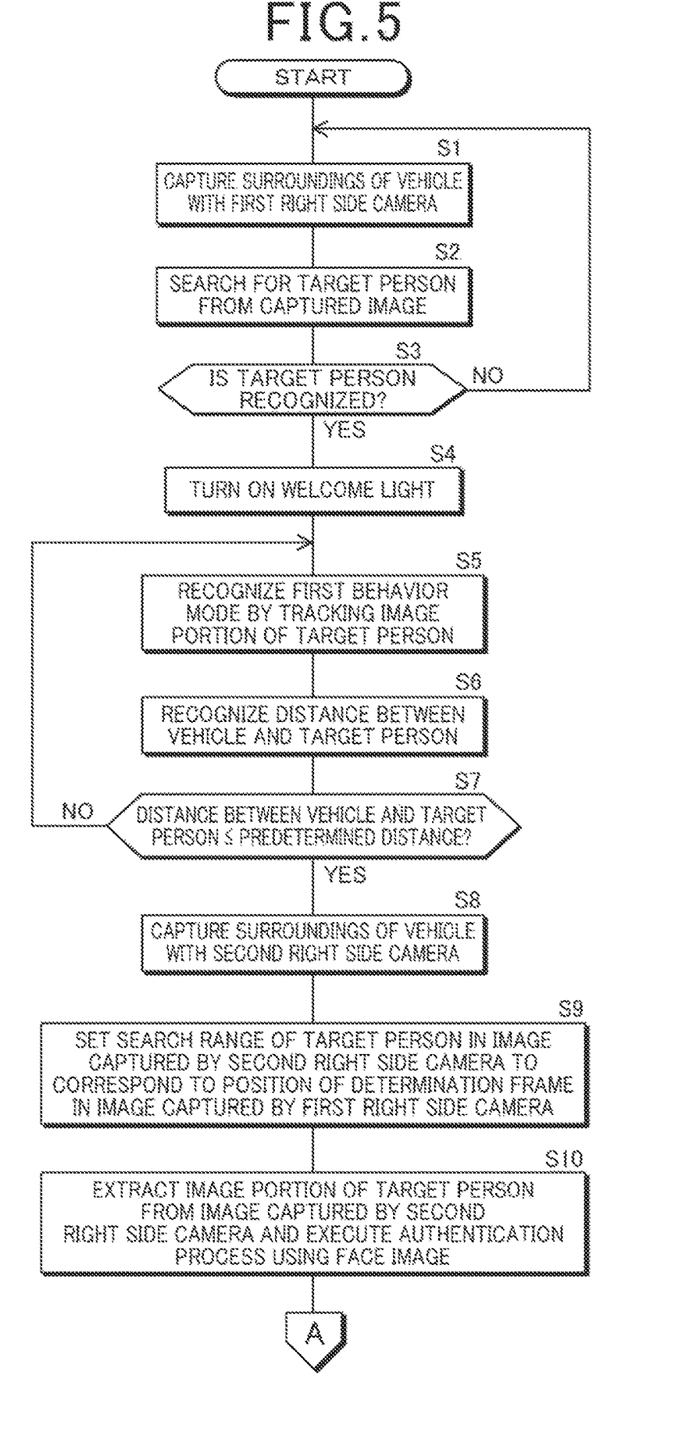
FIG. 5 is a first flowchart of a control process according to a behavior of the target person.

In step S1 in FIG. 5, the first behavior mode recognition unit 21 captures the right side of the vehicle 1 with the first right side camera 41a. In subsequent step S2, the first behavior mode recognition unit 21 searches for a target person from the image captured by the first right side camera 41a. In next step S3, when the first behavior mode recognition unit 21 recognizes the target person, the process proceeds to step S4, and when the first behavior mode recognition unit 21 does not recognize the target person, the process proceeds to step S1. In the example of FIG. 1, the target person U is recognized.

In step S4, the control unit 26 causes the welcome light 50 to be turned on. In subsequent step S5, the first behavior mode recognition unit 21 tracks the image portion u1 of the target person U as described above with reference to FIG. 3, and recognizes the first movement locus of the target person U. In subsequent step S6, the target person distance recognition unit 22 recognizes the distance between the target person U and the vehicle 1.

In next step S7, the second behavior mode recognition unit 23 determines whether the distance between the target person U and the vehicle 1 is equal to or less than a predetermined distance. Then, when the second behavior mode recognition unit 23 determines that the distance between the target person U and the vehicle 1 is equal to or less than the predetermined distance, the process proceeds to step S7 to start the second behavior mode recognition process, and when the second behavior mode recognition unit 23 determines that the distance between the target person U and the vehicle 1 exceeds the predetermined distance, the process proceeds to step S1.

In step S8, the second behavior mode recognition unit 23 captures surrounds of the vehicle 1 with the second right side camera 41b. In next step S9, the user authentication unit 25 sets search ranges of the image portion of the target person U in the image captured by the second right side camera 41b to correspond to the position of the image portion of the target person U in the image captured by the first right side camera 41a as described above with reference to FIG. 4.

In subsequent step S10, the user authentication unit 25 extracts the image portion of the target person U from the image captured by the second right side camera 41b, and executes the authentication process using the face image of the target person U. In step S11 in FIG. 6, the user authentication unit 25 determines in the authentication process that the target person U is the registered user, the process proceeds to step S12, and when user authentication unit 25 determines that the target person U is not the registered user, the process proceeds to step S18.

In step S12, the second behavior mode recognition unit 23 captures surroundings of the vehicle 1 with the second right side camera 41b. In subsequent step S13, the second behavior mode recognition unit 23 tracks the image portion u2 of the target person U as described above with reference to FIG. 3, and recognizes the second movement locus of the target person.

In next step S14, the target person behavior recognition unit 24 determines whether a plurality of target persons exist. Then, when the target person behavior recognition unit 24 determines that the plurality of target persons exist, the process proceeds to step S30 to recognize the behavior of the target person (here, the registered user) based only on the second movement locus, and the process proceeds to step S16.

On the other hand, when there is only one target person, the process proceeds to step S15, and the target person behavior recognition unit 24 recognizes a behavior of the target person (here, the registered user) U based on the first movement locus and the second movement locus. In this way, using the first movement locus, the target person behavior recognition unit 24 can recognize the behavior of the target person U earlier than the case where the behavior of the target person U is recognized only by the second movement locus in step S30. In the following description, the target person U is also referred to as a user U.

In step S16, when the control unit 26 recognizes the behavior of the user U that the user U is approaching the driver's door 2 according to the guide display 51 (see FIG. 1) irradiated by the welcome light 50, the process proceeds to step S17. On the other hand, when the control unit 26 does not recognize such a behavior in step S16, the process proceeds to step S18.

In step S17, the control unit 26 causes the driver's door 2 to be unlocked. In next step S18, the control unit 26 causes the welcome light 50 to be turned off.

Figure 6:
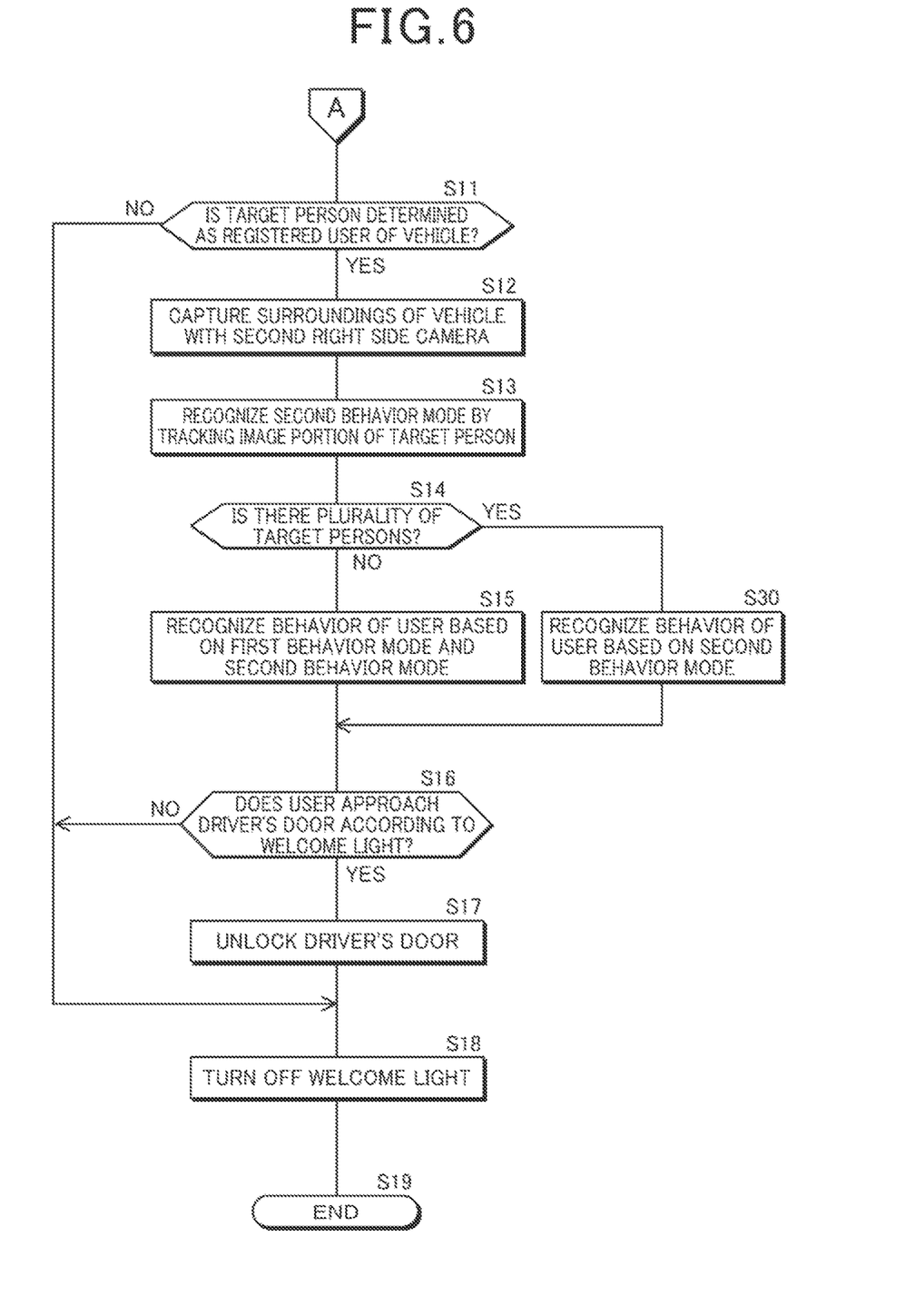
FIG. 6 is a second flowchart of a control process according to a behavior of the target person.

In the processes of the flowcharts of FIGS. 5 and 6, the following entry process 1 or entry process 2 may be performed on the power door of the vehicle 1.

(Entry process 1) After step S11 in FIG. 6, a process of opening the power door is performed. When the first behavior mode recognition unit 21 recognizes the first movement locus, the first behavior mode recognition unit 21 recognizes, as a first behavior mode of the target person U, that the target person U performs a gesture A for opening the door of the vehicle 1. When it is recognized that the target person U performs the gesture A for opening the door of the vehicle 1, the control unit 26 perform predetermined control to make the driver's door 2 as the power door be in an opened state when it is determined from the image captured by the second right side camera 41b in step S11 that the target person U is the registered user.

In this case, information of the gesture A for opening the driver's door is stored in the memory 30 in association with opening control of the driver's door 2, and the first behavior mode recognition unit 21 recognizes the gesture A for opening the driver's door by the target person U with reference to the information of the gesture A. Further, when the first behavior mode recognition unit 21 recognizes the first movement locus, the control unit 26 performs predetermined control to make the front passenger's door as the power door of the vehicle 1 be in an opened state after the target person U is determined to be the registered user in step S11 at the time of the recognition of the fact that the target person U is speaking "open the front passenger's door" while approaching the vehicle 1 through an out-of-vehicle microphone (not shown) provided in the vehicle 1.

(Entry process 2) After step S15 in FIG. 6, a process of opening the power door is performed. When the first behavior mode recognition unit 21 recognizes the first movement locus, the first behavior mode recognition unit 21 recognizes, as a first behavior mode of the target person U, a gesture A indicating that the target person U wants to open the door of the vehicle 1. When it is recognized that the target person U performs the gesture A for opening the door of the vehicle 1, the control unit 26 perform predetermined control to make the power door approached by the target person U be in an opened state after step S16 when it is determined from the image captured by the second right side camera 41b in step S11 that the target person U is the registered user.

Further, when the first behavior mode recognition unit 21 recognizes the first movement locus, the control unit 26 performs predetermined control to make the power door approached by the target person U be in an opened state after step S16 when the target person U is determined to be the registered user in step S11 at the time of the recognition of the fact that the target person U is speaking "open the door" while approaching the vehicle 1 through the out-of-vehicle microphone (not shown) provided in the vehicle 1.

4. Another Embodiment

In the above-described embodiment, the user authentication unit 25 performs the authentication process of the registered user of the vehicle 1 using the face image of the target person U. As another embodiment, the registered user may be authenticated when the communication unit receives an identification code transmitted from a mobile key or a mobile terminal possessed by the target person U.

In the above-described embodiment, the first front camera 40a and the second front camera 40b are provided, but may be provided as an integrated camera or separate cameras. Even in the case of the integrated camera, the relationship does not change that the second front camera 40b has a higher resolution than the first front camera 40a and the second front camera 40b consumes more power consumption than the first front camera 40a. In other words, the first front camera 40a is a camera that performs capturing in a low resolution/low current capturing mode, and the second front camera 40b is a camera that performs capturing in a high resolution/high current capturing mode. In addition, the relationship between the first rear camera 43a and the second rear camera 43b, the relationship between the first right side camera 41a and the second right side camera 41b, and the relationship between the first left side camera 42a and the second left side camera 42b also do not change.

In the above-described embodiment, the vehicle control method of the present disclosure is executed by the processor 20 (corresponding to the computer of the present disclosure) provided in the vehicle control device 10, but the vehicle control method of the present disclosure may be executed by a computer or the like constituting the external server that communicates with the vehicle 1. In this case, information of the target existing around the vehicle 1 is transmitted from the vehicle 1 to the external server, and control information is transmitted from the external server to the vehicle 1 to instruct, for example, turning-on or off of the welcome light 50 and unlocking of the door of the vehicle 1. In addition, the first behavior mode recognition unit 21, the target person distance recognition unit 22, the second behavior mode recognition unit 23, the target person behavior recognition unit 24, the user authentication unit 25, and the control unit 26 may be distributed to the vehicle control device 10 and the external server.

Figure 2:
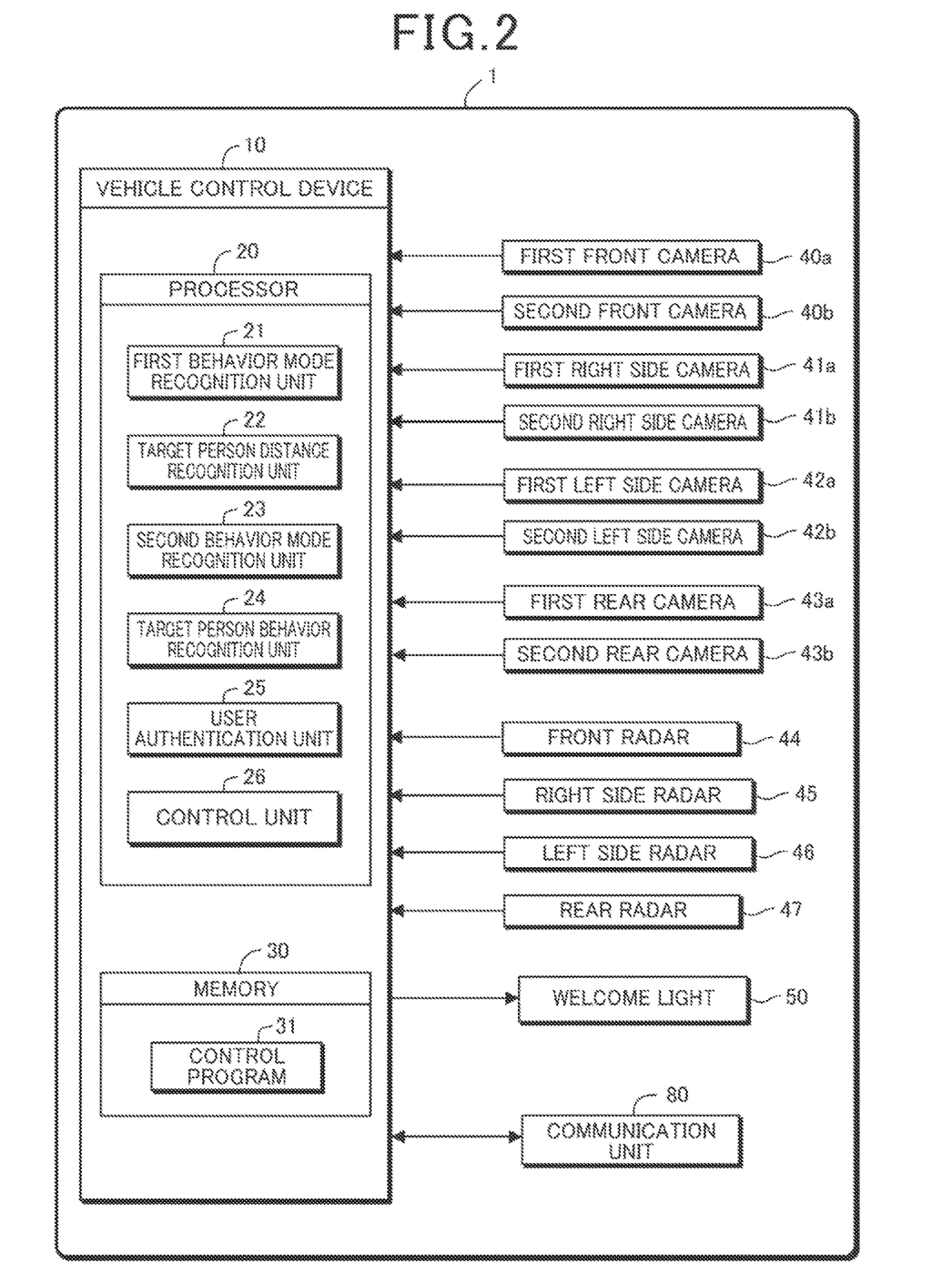
FIG. 2 is a configuration diagram of the vehicle control device.

FIGS. 1 and 2 are the schematic diagrams showing the configurations of the vehicle 1 and the vehicle control device 10 by dividing the configurations depending on main process contents in order to facilitate understanding of the present invention, and the configurations of the vehicle 1 and the vehicle control device 10 may be configured by other divisions. In addition, the process of each of the components may be executed by one hardware unit, or may be executed by a plurality of hardware units. Further, the process of each of the components shown in the flowchart of FIGS. 5 and 6 may be executed by one program, or may be executed by a plurality of programs.

5. Configurations Supported by Embodiment Described Above

The above-described embodiment is a specific example of the following configurations.

(Item 1) A vehicle control device including: a first behavior mode recognition unit that executes a first behavior mode recognition process of using a first camera to capture surroundings of the vehicle and recognizing a first behavior mode of a target person existing around the vehicle based on an image captured by the first camera, the first camera being mounted on a vehicle and having a first resolution; a target person distance recognition unit that recognizes a distance between the vehicle and the target person; a second behavior mode recognition unit that, when the distance between the vehicle and the target person is equal to or less than a predetermined distance during execution of the first behavior mode recognition process, executes a second behavior mode recognition process of using a second camera to capture surroundings of the vehicle and recognizing a second behavior mode of the target person based on an image captured by the second camera, the second camera being mounted on the vehicle and having a second resolution higher than the first resolution; a target person behavior recognition unit that recognizes a behavior of the target person against the vehicle based on the first behavior mode and the second behavior mode; and a control unit that executes predetermined control on the vehicle based on the behavior of the target person recognized by the target person behavior recognition unit.

According to the vehicle control device of Item 1, it is possible to reduce power consumption of the in-vehicle camera and accurately recognize the behavior of the target person existing around the vehicle from the image captured by the in-vehicle camera.

(Item 2) In the vehicle control device according to Item 1, the first behavior mode recognition unit recognizes the first behavior mode having continuity with the second behavior mode in the first behavior mode recognition process by converting a position of an image portion of the target person in the image captured by the first camera into a corresponding position in the image captured by the second camera through coordinate conversion from a coordinate system of the first camera to a coordinate system of the second camera.

According to the vehicle control device of Item 2, it is possible to accurately recognize the movement locus of the target person by cooperating the movement locus of the target person based on the image captured by the first camera with the movement locus of the target person based on the image captured by the second camera.

(Item 3) In the vehicle control device according to Item 1 or 2, the vehicle control device further includes a user authentication unit that determines from a face image of the target person whether the target person is a user of the vehicle, the face image of the target person being extracted from the image captured by the second camera, wherein the control unit regards the behavior of the target person recognized by the target person behavior recognition unit as a behavior of the user and executes the predetermined control when the user authentication unit determines that the target person is the user.

According to the vehicle control device of Item 3, it is possible to perform user authentication with accuracy using the image captured with the second camera having the high resolution and retroactively recognize the first behavior mode as the movement locus of the user.

(Item 4) In the vehicle control device according to Item 3, the user authentication unit sets a search range of an image of the target person in the image captured by the second camera, based on a position in the image captured by the first camera of an image portion of the target person extracted when the first behavior mode is recognized in the first behavior mode recognition process.

According to the vehicle control device of Item 4, it is possible to efficiently search for the image of the target person by limiting the search range of the image of the target person in the image captured by the second camera.

(Item 5) In the vehicle control device according to any one of Items 1 to 4, when a plurality of the target persons are recognized in the first behavior mode recognition process, the target person behavior recognition unit recognizes the behavior of the target person based only on the second behavior mode without using the first behavior mode.

According to the vehicle control device of Item 5, when the plurality of target persons cannot be distinguished and recognized in the image captured by the first camera having the low resolution, it is possible to prevent the recognition accuracy of the movement locus of the target person from being lowered by non-use of the first behavior mode.

(Item 6) A vehicle control method to be executed by a computer, the method including: a first behavior mode recognition step of executing a first behavior mode recognition process of using a first camera to capture surroundings of the vehicle and recognizing a first behavior mode of a target person existing around the vehicle based on an image captured by the first camera, the first camera being mounted on a vehicle and having a first resolution; a target person distance recognition step of recognizing a distance between the vehicle and the target person; a second behavior mode recognition step of, when the distance between the vehicle and the target person is equal to or less than a predetermined distance during execution of the first behavior mode recognition process, executing a second behavior mode recognition process of using a second camera to capture surroundings of the vehicle and recognizing a second behavior mode of the target person based on an image captured by the second camera, the second camera being mounted on the vehicle and having a second resolution higher than the first resolution; a user behavior recognition step of recognizing a behavior of the target person against the vehicle based on the first behavior mode and the second behavior mode; and a control step of executing predetermined control on the vehicle based on the behavior of the target person recognized in the user behavior recognition step.

When the vehicle control method according to Item 6 is executed by the computer, it is possible to obtain the same operational effects as those of the vehicle control device of Item 1.

REFERENCE SIGNS LIST 1 vehicle
2 driver's door
10 vehicle control device
20 processor
21 first behavior mode recognition unit
22 target person distance recognition unit
23 second behavior mode recognition unit
24 target person behavior recognition unit
25 user authentication unit
26 control unit
30 memory
31 control program
40a first front camera
40b second front camera
41a first right side camera
41b second right side camera
42a first left side camera
42b second left side camera
43a first rear camera
43b second rear camera
50 welcome light
U target person

What is claimed is:
1. A vehicle control device comprising:
a first front camera and a second front camera that are mounted on a vehicle and that capture a front of the vehicle, a first left side camera and a second left side camera that are mounted on the vehicle and that capture a left side of the vehicle, a first right side camera and a second right side camera that are mounted on the vehicle and that capture a right side of the vehicle, a first rear camera and a second rear camera that are mounted on the vehicle and that capture a rear of the vehicle, and a processor,
wherein
the second front camera, the second left side camera, the second right side camera, and the second rear camera correspond to the first front camera, the first left side camera, the first right side camera, and the first rear camera, respectively, and have resolutions higher than those of the first front camera, the first left side camera, the first right side camera, and the first rear camera, respectively, the processor:
executes a first behavior mode recognition process of recognizing a movement locus of a target person existing around the vehicle from time-series captured images sequentially captured at a predetermined timing by the first front camera, the first left side camera, the first right side camera, and the first rear camera, and based on the movement locus recognized, recognizes a first behavior mode of the target person;
recognizes a distance between the vehicle and the target person;
when the distance between the vehicle and the target person is equal to or less than a predetermined distance during execution of the first behavior mode recognition process, executes a second behavior mode recognition process of starting operation of at least one of the second front camera, the second left side camera, the second right side camera, and the second rear camera which correspond to at least one of the first front camera, the first left side camera, the first right side camera, and the first rear camera that captures the captured images from which the target person is recognized, capturing surroundings of the vehicle by the at least one of the second front camera, the second left side camera, the second right side camera, and the second rear camera whose operation was started, and recognizing a second behavior mode of the target person based on an image captured by the at least one of the second front camera, the second left side camera, the second right side camera, and the second rear camera;
recognizes a behavior of the target person against the vehicle based on the first behavior mode and the second behavior mode; and
executes predetermined control on the vehicle based on the behavior of the target person recognized.

2. The vehicle control device according to claim 1, wherein
the processor recognizes the first behavior mode having continuity with the second behavior mode in the first behavior mode recognition process by converting a position of an image portion of the target person in the image captured by the first camera into a corresponding position in the image captured by the second camera through coordinate conversion from a coordinate system of the first camera to a coordinate system of the second camera.

3. The vehicle control device according to claim 1, wherein
the processor determines from a face image of the target person whether the target person is a user of the vehicle, the face image of the target person being extracted from the image captured by the second camera, and
regards the behavior of the target person recognized as a behavior of the user and executes the predetermined control when the target person is determined as the user.

4. The vehicle control device according to claim 3, wherein
the processor sets a search range of an image of the target person in the image captured by the second camera, based on a position in the image captured by the first camera of an image portion of the target person extracted when the first behavior mode is recognized in the first behavior mode recognition process.

5. A vehicle control method to be executed by a computer, the method comprising:
a first behavior mode recognition step of executing a first behavior mode recognition process of capturing surroundings of a vehicle by a first front camera and a second front camera that are mounted on a vehicle and that capture a front of the vehicle, a first left side camera and a second left side camera that are mounted on the vehicle and that capture a left side of the vehicle, a first right side camera and a second right side camera that are mounted on the vehicle and that capture a right side of the vehicle, a first rear camera and a second rear camera that are mounted on the vehicle and that capture a rear of the vehicle, the second front camera, the second left side camera, the second right side camera, and the second rear camera correspond to the first front camera, the first left side camera, the first right side camera, and the first rear camera, respectively, and have resolutions higher than those of the first front camera, the first left side camera, the first right side camera, and the first rear camera, respectively, recognizing a movement locus of a target person existing around the vehicle from time-series captured images sequentially captured at a predetermined timing by the first front camera, the first left side camera, the first right side camera, and the first rear camera, and based on the movement locus recognized, recognizing a first behavior mode of the target person;
a target person distance recognition step of recognizing a distance between the vehicle and the target person;
a second behavior mode recognition step of, when the distance between the vehicle and the target person is equal to or less than a predetermined distance during execution of the first behavior mode recognition process, executing a second behavior mode recognition process of starting operation of at least one of the second front camera, the second left side camera, the second right side camera, and the second rear camera, which correspond to at least one of the first front camera, the first left side camera, the first right side camera, and the first rear camera that captures the captured images from which the target person is recognized, capturing surroundings of the vehicle by the at least one of the second front camera, the second left side camera, the second right side camera, and the second rear camera whose operation was started, and recognizing a second behavior mode of the target person based on an image captured by the at least one of the second front camera, the second left side camera, the second right side camera, and the second rear camera;
a user behavior recognition step of recognizing a behavior of the target person against the vehicle based on the first behavior mode and the second behavior mode; and
a control step of executing predetermined control on the vehicle based on the behavior of the target person recognized in the user behavior recognition step.

* * * * *